April 28, 1931.　　G. E. HECKMAN　　1,802,893
AIR CURRENT MOTOR
Filed Feb. 4, 1928　　2 Sheets-Sheet 1

April 28, 1931.  G. E. HECKMAN  1,802,893
AIR CURRENT MOTOR
Filed Feb. 4, 1928  2 Sheets-Sheet 2

Inventor
G. E. Heckman
By Watson E. Coleman
Attorney

Patented Apr. 28, 1931

1,802,893

UNITED STATES PATENT OFFICE

GEORGE E. HECKMAN, OF PALODURO, TEXAS

AIR-CURRENT MOTOR

Application filed February 4, 1928. Serial No. 251,971.

This invention relates to motors propelled by currents of air, and the general object of the invention is to provide a motor having a wind tunnel and a stack, the stack being of such height as to cause a constant draft of air through the tunnel and up the stack, there being a shaft extending through the tunnel and having vanes mounted thereon which are rotated by the action of the moving air current, thus providing a motor of a very simple character which will operate constantly under practically all circumstances and which will generate power at practically no cost except that due to the necessity of lubricating the bearings.

My invention is illustrated in the accompanying drawings, wherein:—

Figure 1:
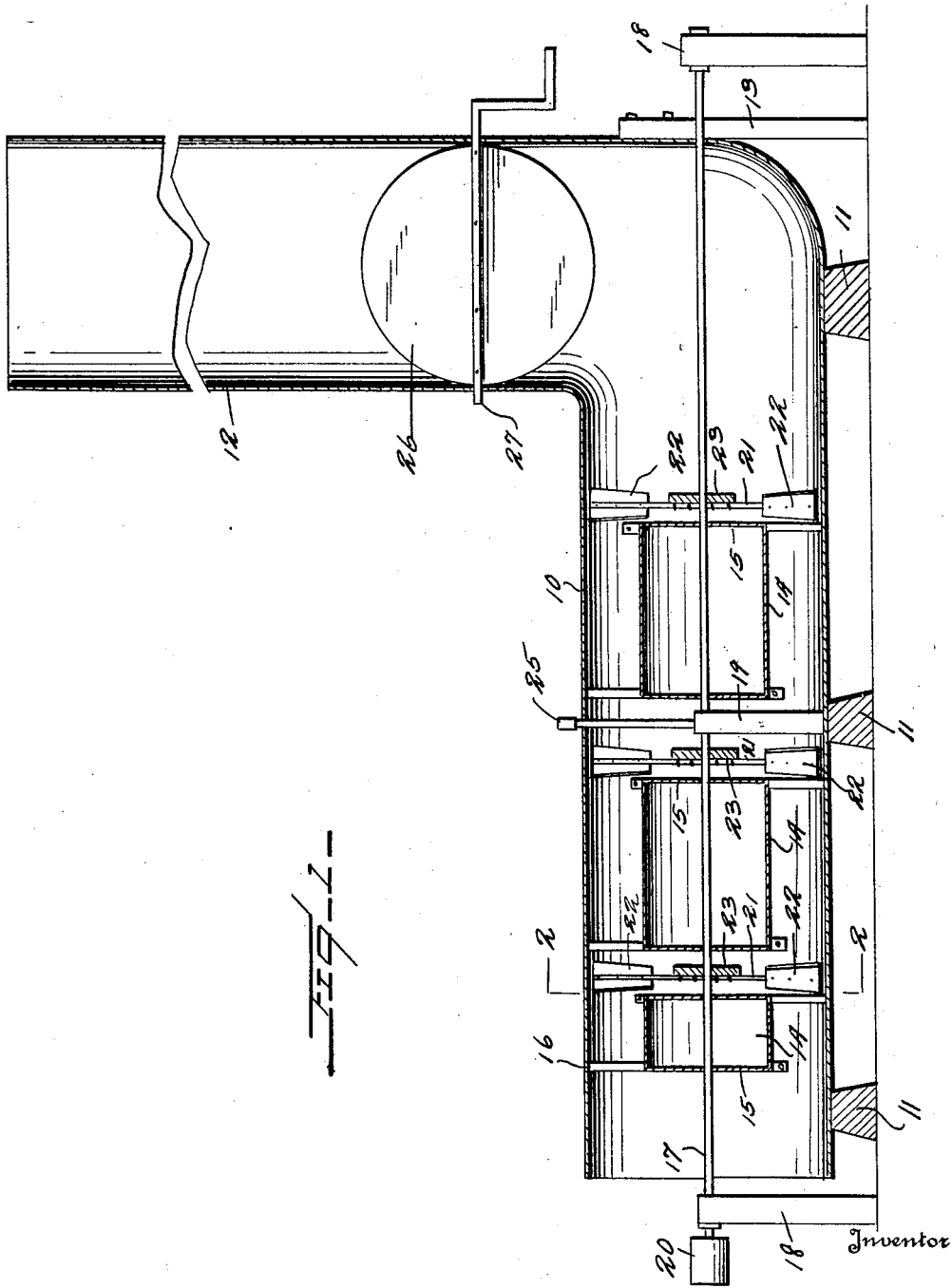
Figure 1 is a sectional view of an air current motor constructed in accordance with my invention.

Referring to these drawings, 10 designates a wind tunnel which may be of any desired diameter but which, as shown, is formed of sheet metal and, for example, will have a diameter of six feet. This is mounted upon supports 11 and at one end of the wind tunnel there is a stack 12 which extends upward to any desired height as, for instance, fifty or sixty feet. This stack is shown as being supported by a supporting brace. Other and additional braces may be used if desired.

Disposed within the wind tunnel 10 are a plurality of cylindrical drums 14 which may be conveniently made of sheet metal, these drums being closed at their opposite ends, as at 15. The drums may be either solid or hollow, though preferably for the sake of cheapness and lightness they will be hollow. These drums may have a diameter of, say three feet, or one-half the diameter of the wind tunnel. The drums are held in spaced relation to the wind tunnel and centered therein by means of the radially extending braces 16 bolted or riveted to the drums and to the tunnel. Two of the drums have approximately the same length as, for instance, four feet long, but the first drum of the series has preferably a length much shorter as, for instance, one foot.

Figure 2:
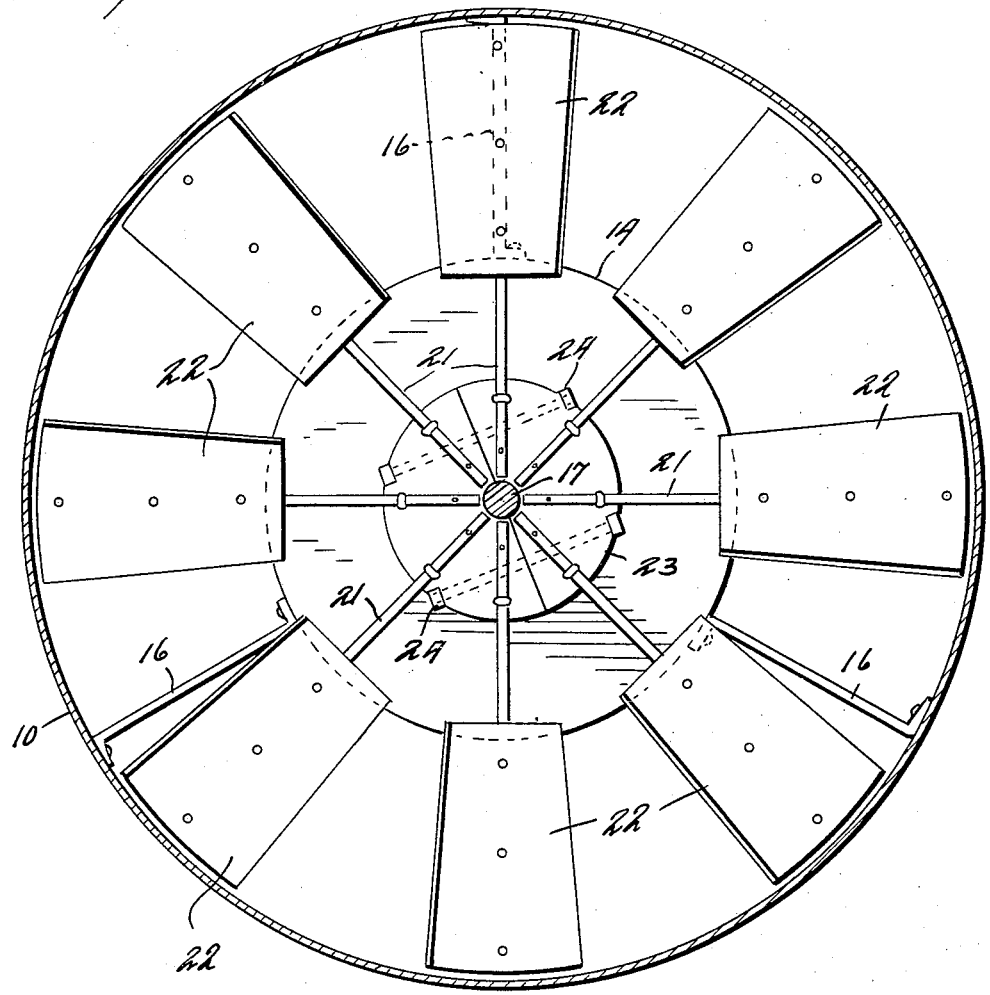
Figure 2 is a sectional view on the line 2—2 of Figure 1 enlarged.

Extending longitudinally through the air tunnel and through these drums is a shaft 17 mounted in suitable bearings 18 at its ends and a middle bearing 19 at its middle, this shaft carrying upon it at one end a pulley 20 whereby power may be taken from the shaft. Mounted upon the shaft and between the confronting ends of the drums and at the rear end of the rearmost drum are windwheels, each wheel consisting of a plurality of radial shafts 21 connected to each other in any suitable manner, and mounted upon these shafts are the vanes 22 like the vanes of a windmill, these vanes being of sufficient length that they will extend from the periphery of the air tunnel inward to a point slightly inward of the periphery of the drum, as shown in Figure 2. These radial shafts 21 or arms supporting the vanes extend into a hub 23, this hub being in sections and held upon the shaft by the bolts 24 or other suitable means of like character. Preferably a lubricating pipe 25 extends out through the wind tunnel so that the middle bearing 19 may be lubricated.

In order to regulate the speed of the windwheels and, therefore, the speed of the power shaft 17, I provide within the stack 12 a damper 26, the damper being mounted upon a shaft 27 extending out through the stack and having means whereby the damper may be turned to fully close, partially close, or entirely open passage through the stack. It will be seen that the stack 12 will cause a draft through the wind tunnel and the higher the stack, the greater the draft will be, and that this draft will cause the rotation of the several windwheels mounted upon the power shaft and that this power shaft may be rotated and power may be taken therefrom for driving small machines of light character.

I have found in practice that no matter what size the wind pipe or tunnel may be, the drums should be about one-half the size of the wind tunnel or pipe. This causes the air to draw much faster past the windwheels as the drums decrease the size of the pipe at this point.

While I have shown three windwheels and three drums, I do not wish to be limited to this as obviously the device might be expanded to secure more power. I do not wish to be limited to the particular character of the windwheels as these also may be varied.

I claim:—

An air current motor of the character described comprising in combination with an elongated tubular member having one end thereof open, the opposite end having a vertically disposed extension whereby to produce a draft of air through the tubular member, a shaft, means for mounting said shaft in said tunnel concentrically thereof, a plurality of windwheels spacedly positioned along said shaft, air diverting means spacedly positioned in said tubular member, means for securing said air diverting means to said tubular member said air diverting means being disposed forwardly of said windwheels whereby to direct the air current against the outer end portions thereof, and draft regulating means mounted in said vertical extension of said tubular member.

In testimony whereof I hereunto affix my signature.

GEORGE E. HECKMAN.